Dec. 24, 1968   KICHISABURO YAMAZAKI   3,417,890
TRAILER FOR TOWING CARS

Filed July 18, 1966   2 Sheets-Sheet 1

Dec. 24, 1968   KICHISABURO YAMAZAKI   3,417,890
TRAILER FOR TOWING CARS

Filed July 18, 1966                     2 Sheets-Sheet 2

United States Patent Office 3,417,890
Patented Dec. 24, 1968

3,417,890
TRAILER FOR TOWING CARS
Kichisaburo Yamazaki, 237 2-chome, Koyasu Dori,
Kanagawa-ku, Yokohama, Japan
Filed July 18, 1966, Ser. No. 565,942
6 Claims. (Cl. 214—506)

ABSTRACT OF THE DISCLOSURE

A trailer for towing disabled automobiles has a longitudinal shaft provided at its front end with a hitch for attachement to a towing vehicle. A cross frame adapted to receive opposite wheels of a vehicle to be towed is supported on a turntable which is slidable longitudinally on the shaft. A running gear comprising road wheels is also slidable longitudinally on the shaft. Means is provided for releasably securing the slides in fixed position.

The present invention relates to trailer and particularly to trailer for towing disabled automobiles.

In accordance with the invention a trailer attached to a towing vehicle supports one end of a disabled vehicle, for example the front end, so that the disabled vehicle can be towed to a service or repair station. It is an object of the invention to provide a trailer on which one end of a disabled vehicle can easily be loaded by a single operator so that it is unnecessary to send a larger crew to pick up the disabled vehicle.

It is a further object of the invention to provide a towing trailer which is of simple construction, lightweight, and inexpensive.

The objects and advantages of the invention will be more fully understood from the following description of preferred embodiments shown by way of example in the accompanying drawing in which, FIG. 1 is a perspective view of a towing trailer in accordance with the invention.

Figure 1:
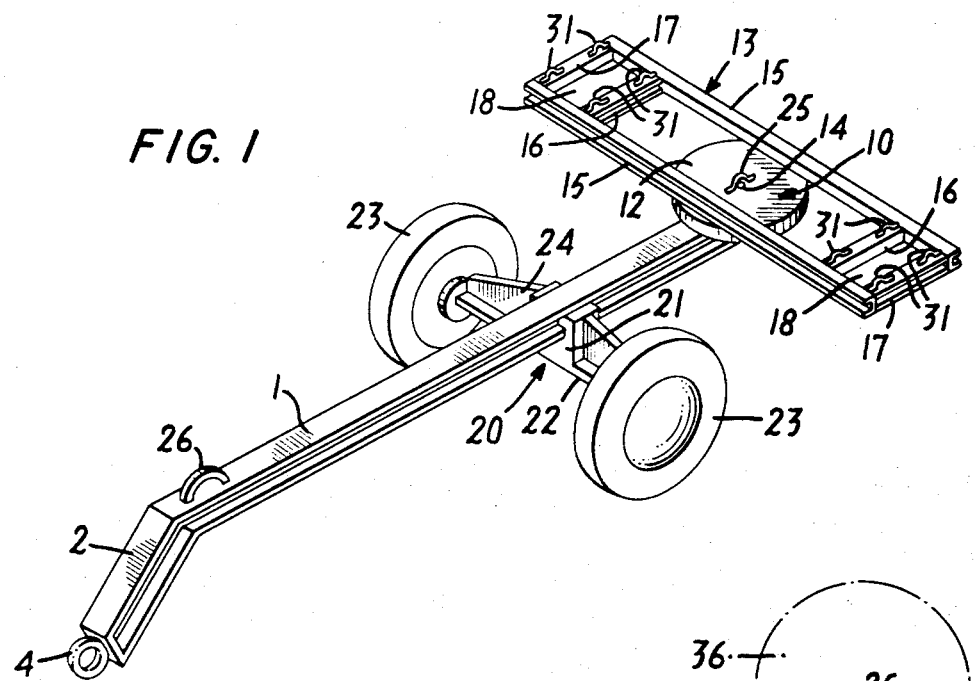

The trailer illustrated by way of example of the drawing comprises a longitudinal beam or shaft 1, which extends lengthwise of the trailer and is straight except for a downwardly inclined front end portion 2. In cross section, the shaft 1 is of I-beam configuration with an upper flange portion 1a, a lower flange portion 1b, and a connecting vertical web portion 1c. It will be seen that the upper and lower flange portions and connecting web portion define longitudinally extended channels on opposite sides of the shaft. At the rear end of the shaft 1 these side channels are closed by an end wall 3. At the front end of the shaft 1 there is provided a trailer hitch shown in the form of a ring 4 for attaching the trailer to a towing vehicle.

An upper sliding unit 10 is slideable along the upper side of the shaft 1, and comprises a slide 11, turntable 12, and cross frame 13 for supporting a vehicle to be towed. The slide 11 is slideable longitudinally on and supported by the upper flange portion 1a of the shaft 1 and has edge portions 11a which engage in the recesses under the flange 1a so as to secure the slide 11 slideably on the shaft 1.

The turntable 12 is rotatably supported by the slide 11 so as to turn about a vertical axis defined, for example, by a stub shaft 14. The cross frame 13 is carried by the turntable 12, and is shown as comprising bars 15 of channel-shaped cross section having central portions secured to the turntable 12, for example by welding. The other end portions of the bar 15 are connected by spaced cross bars 16 and 17 defining frames 18 for receiving the wheels of a vehicle to be towed.

A second slide unit 20 is slideable along the lower side of the longitudinal shaft 1 and comprises a slide 21, a transverse axle 22 and pneumatically tired road wheels 23 rotatably supported by the axle. The slide 21 engages, and is slideable longitudinally along, the lower flange 1b of the shaft 1 and has edge portions 21a which engage in the channels on opposite sides of the shaft 1 so as to secure the slide slideably on the shaft. The slide 21 rests on and is carried by the axle 22 and is braced by wing portions 24. The wheels 23 are, of course, provided with suitable bearings and may be provided with brakes if desired. As will be seen from the drawings the lower slide 20 with the axle 22 and wheels 23 constitute the running gear for supporting the trailer.

Means is provided for moving the upper slide unit 10 longitudinally along the shaft. Such means is shown by way of example in FIGURES 1 to 7 of the drawings as comprising a loop or ring 25 secured to the turntable 12 and a loop or ring 26 provided on the shaft 1 near its forward end. A suitable traction device is provided for attachment between the rings 25 and 26 to pull the upper slide unit 10 forwardly along the shaft 1. Such traction device is shown by way of example as comprising a chain block 27 attached to the ring 26 and having a line 28 attachable to the ring 25. An operating handle 29 is provided for actuating the device.

Means is also provided for securing a vehicle to be towed on the trailer. Suitable securing means is illustrated by way of example in the drawings as comprising rings or eyes 31 provided on the cross bar 16, 17 of the cross frame 13 for the attachment of ropes 32 for securing the wheels of a towed vehicle received in the frames 18.

Figure 4:
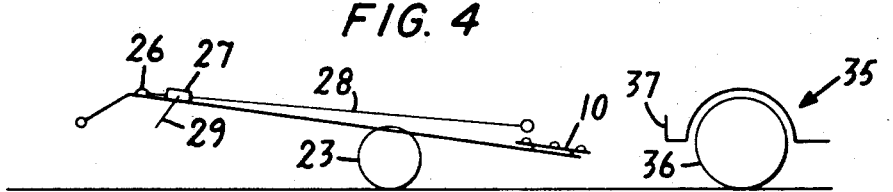
FIGS. 4, 5, 6 and 7 are schematic side views illustrating successive steps in loading a vehicle onto the trailer.
Figure 5:
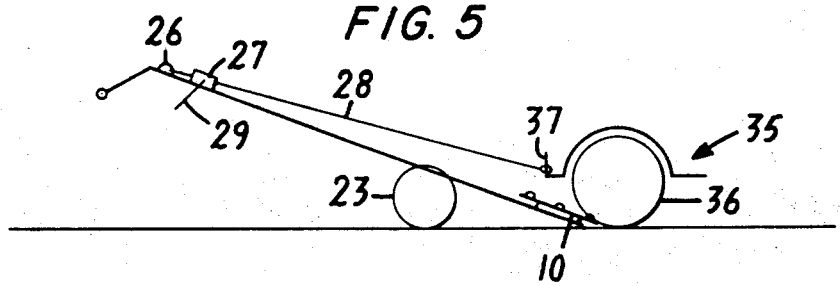
Figure 6:
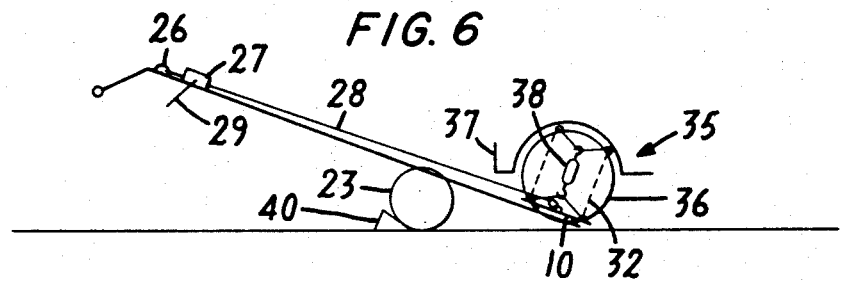

The operation of loading a disabled vehicle onto the towing trailer is illustrated schematically in FIGURES 4 to 7. With the lower slide unit 20 with wheels 23, positioned approximately at a central portion of the shaft 1, the trailer is backed up to an end of a disabled vehicle 35 which is to be towed, as illustrated in FIGURES 4 and 5. The front end of the trailer is elevated so as to position the cross frame 13 on the ground just in front of the wheels 36 of the diasabled vehicle. The line 28 of the pulling device 27 is attached to the disabled vehicle, for example to the bumper 37. The pulling device 27 is then operated so as to pull the disabled vehicle forwardly with respect to the trailer and thereby position the wheels of the disabled vehicle in the frame portions 18 of the cross frame 13. The wheels of the disabled vehicle are then secured in place on the cross frame, for example by ropes 32 attached to the eyes 31 and secured by a turnbuckle or other device 38 as illustrated in FIG. 6.

Figure 7:
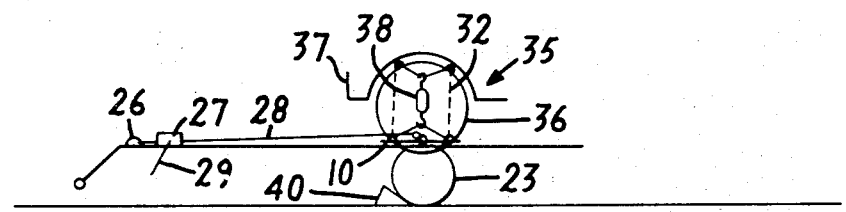

The line 28 of the pulling device 27 is then attached to the cross frame 13, for example by the ring 25, and is actuated to pull the cross frame 13, carrying one end of the disabled vehicle, forwardly until the upper slide unit 10 is approximately over the lower slide unit 20, carried by the wheels 23, as illustarted in FIG. 7.

The forward end of the shaft 1 is then swung downwardly to an approximately horizontal position and the trailer is attached to a suitable towing vehicle (not shown) by means of the trailer hitch 4. The front end of the shaft 1 can be swung downwardly without difficulty, since the weight of the disabled vehicle on the cross frame 13 is approximately positioned at the fulcrum provided by the axle 22 of the lower slide unit 20.

Figure 2:
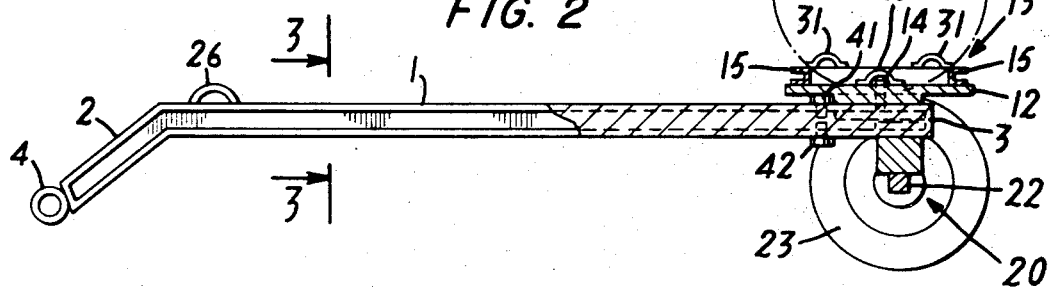
FIG. 2 is a side view partially in section illustrating schematically the front wheels of a towed vehicle being supported by the trailer.
Figure 3:
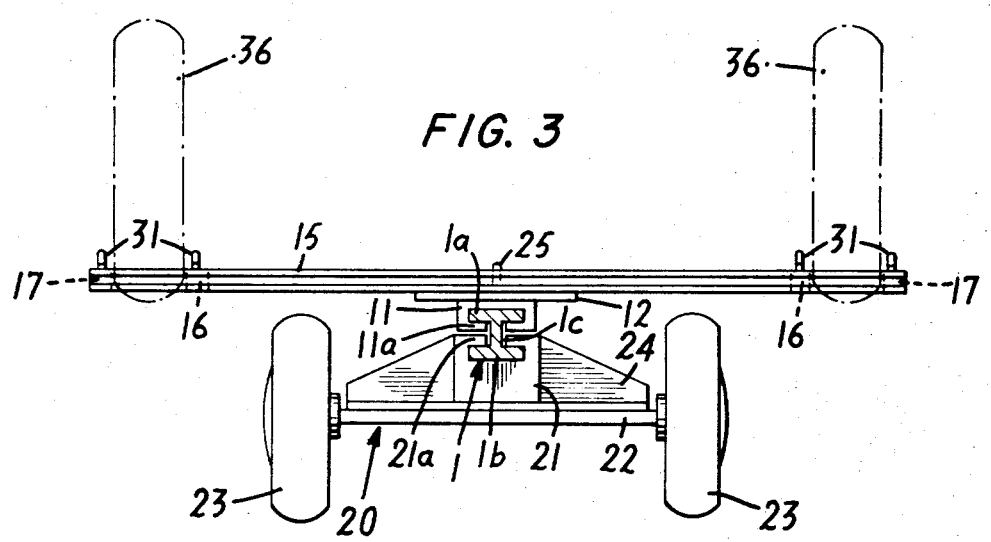
FIG. 3 is a transverse section taken approximately on the line 3—3 in FIG. 2.

The road wheels 23 of the trailer are then locked or blocked for example, by means of their brakes, or as illustrated in FIGS. 6 and 7, by blocks 40. The wheels at the other end of the disabled vehicle which are still resting on the ground are also preferably locked or blocked. The towing vehicle is then driven forwardly so as to pull the shaft 1 of the trailer forwardly with respect to both slide units 10 and 20 until the slide units reach the rear end of the shaft 1 as illustrated in FIG. 2. Further movement is prevented by the end wall 3 which closes the ends of the side channels of shaft 1. The upper and lower slide units 10 and 20 are then secured in position, for example by means of pins 41 and 42 respectively which screw or otherwise fit into suitable holes provided in the shaft 1 just in front of the slide units when in their rear-most position as illustrated in FIG. 2. The wheel blocks 40 are then removed and the trailer and damaged vehicle are towed by the towing vehicle. As the load on the trailer is almost directly over the running gear comprising the road wheels 23, there is little or no weight on the trailer hitch of the towing vehicle. While the slide 21 is shown as being mounted directly on the axle 22, it will be understood that a suitable spring or shock absorbing mount can be provided if desired.

Figure 8:
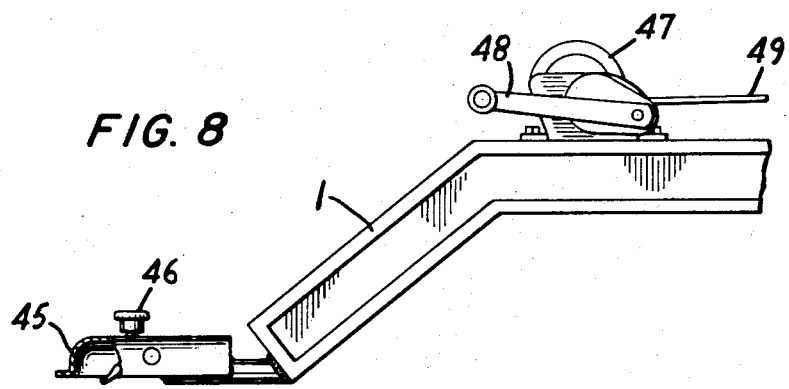
FIG. 8 is a fragmentary side view of the front end portion of the trailer illustrating a modification.

While a preferred embodiment of the invention has been shown by way of example in the drawings, it will be understood that modifications may be made within the scope of the appended claims. For example as illustrated in FIGURE 8, the forward end of the shaft 1 can be provided with a socket type trailer hitch 45 adapted to fit onto a ball on the towing vehicle. An actuating handle 46 is provided for reasonably securing the socket on the ball. In FIGURE 8 there is also shown by way of example a winch 47 having an operating handle 48 and a line 49 provided with a suitable fitting for attachment to the disabled vehicle and to the upper slide unit 10 respectively for operation in leading a vehicle as described above.

What I claim is:

1. A trailer for towing a vehicle comprising a longitudinal shaft having a front end and a rear end, means at the front end of said shaft for attaching said shaft to a towing vehicle, a first slide on the upper side of said shaft and slidable lengthwise thereof, a rotary table carried by said slide and rotatable about a vertical axis, a cross frame carried by said table and rotatable therewith, means on said cross frame for supporting a portion of a vehicle to be towed, a second slide under said shaft and slidable lengthwise thereof, axle means on said second slide, road wheels rotatable on said axle means and comprising running gear for said trailer, means for moving a vehicle to be towed onto said supporting means and for moving said first slide longitudinally of said shaft, means for limiting movement of said slides on said shaft and means for releasably securing said slides against movement on said shaft.

2. A trailer according to claim 1, in which said supporting means comprises wheel supports for receiving opposite wheels of a vehicle to be towed.

3. A trailer according to claim 2, in which said wheel supports are positionable at selected distances from one another on said cross frame.

4. A trailer according to claim 2 further comprising means for securing the wheels of a vehicle to be towed on said wheel supports.

5. A trailer according to claim 1, in which said shaft is of I cross section with upper and lower flanges connected by a vertical web and in which said first slide is slidable on said upper flange and said second slide is slidable on said second flange.

6. A trailer according to claim 1, in which said shaft comprises a straight portion on which said slides are slidable and a forward portion extending downwardly from said straight portion.

References Cited

UNITED STATES PATENTS

| | | | |
|---|---|---|---|
| 2,699,267 | 1/1955 | Beamer | 214—86 |
| 2,701,069 | 2/1955 | Hawkins | 214—86 |
| 3,152,704 | 10/1964 | Russell | 214—86 |

ALBERT J. MAKAY, *Primary Examiner.*

U.S. Cl. X.R.

214—86; 280—402